United States Patent Office 3,422,859
Patented Jan. 21, 1969

3,422,859
PATTERNING MECHANISM FOR
CIRCULAR LOOMS
Armand Malchair, Herstal, Belgium, assignor to Peltzer & Fils S.A., Societe Anonyme, Verviers, Belgium, a company
Filed Sept. 14, 1966, Ser. No. 579,365
Claims priority, application Belgium, Sept. 17, 1965, 669,747
U.S. Cl. 139—13                    10 Claims
Int. Cl. D03d 37/00, 1/00

ABSTRACT OF THE DISCLOSURE

A patterning mechanism for circular looms is provided with an annular roller track associated with each heald frame and operable with the moving equipment of the loom. This track consists of double stretches and switching means between the stretches. The mechanism also includes at least one radial row of non-rotating cams capable of moving to two different levels, each cam being associated with one of the roller tracks. A mechanism interposed between the moving equipment of the loom and each of the non-rotating cams is operable to move and block the non-rotating cams at each of the two levels. These levels correspond to the heald positions forming weaving sheds.

This invention relates to circular looms capable of producing fabrics having weft threads variable as regards nature, quantity and color.

An object of this invention is the provision of a compact patterning mechanism able to cooperate with a practically limitless number of heald frames in such a way that the circular loom acquires a flexibility in operation as well as performance possibilities that it can be used for the weaving of plain fabrics as well as for the weaving of color fabrics with virtually an infinite variety of patterns.

This patterning mechanism can be used as a single unit in a circular weaving loom if this is provided solely for the simultaneous production of fabrics having an identical pattern, or it can be used individually upstream of each of the weaving zones if the loom is provided for the simultaneous production of fabrics of different patterns.

The mechanism of the present invention comprises, at least, firstly, associated with each shaft frame, an annular roller track connected to the moving equipment of the loom, and formed substantially of double stretches separated by switching means; secondly, at least one radial row of non-rotating cams able to occupy two different levels, each cam being associated with one of said roller tracks, and, thirdly, a mechanism interposed between said moving equipment of the loom and each of the said non-rotating cams so as to bring them to and block them at said levels which correspond to the opening of the shed.

These various characteristics features of the invention can be carried out in different forms. An embodiment is described in detail hereafter by reference to the annexed schematic drawings, in which.

Figure 1:
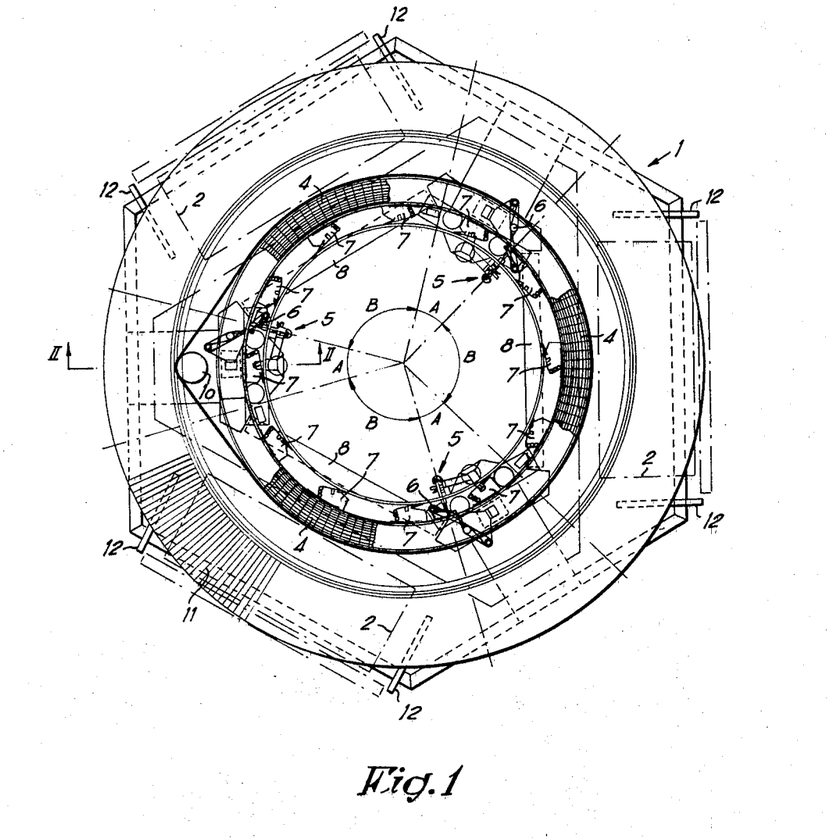
FIGURE 1 is a schematic plan view of a circular loom using the patterning mechanism forming the subject of the invention.
Figure 2:
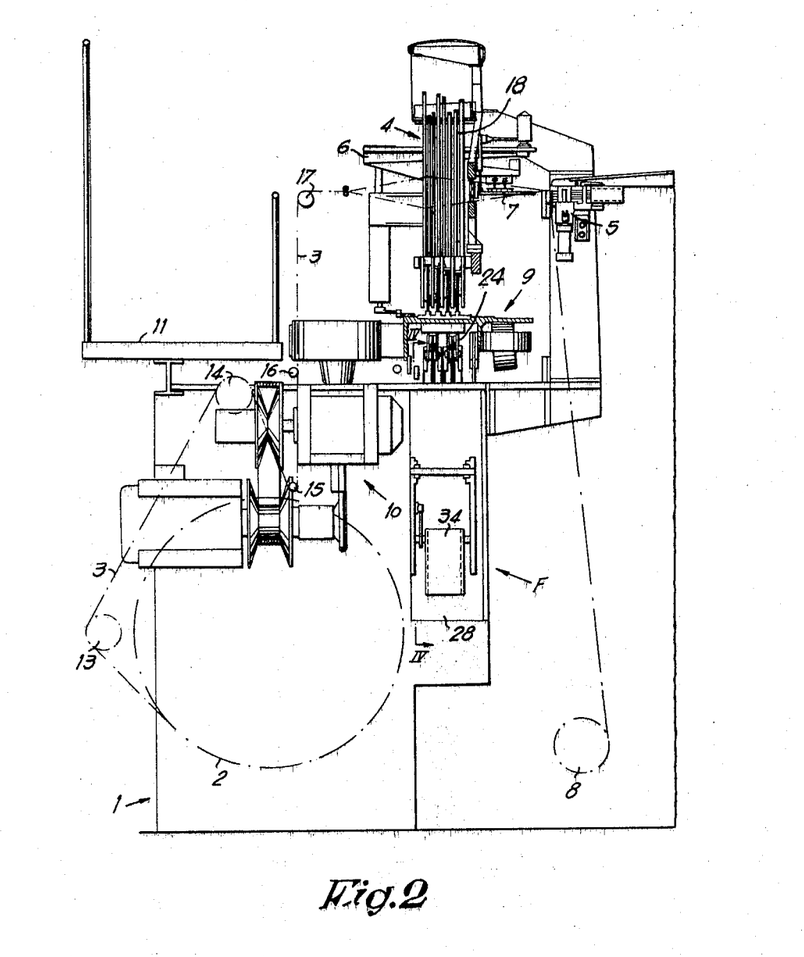
FIGURE 2 is a schematic section on the line II—II of FIGURE 1.

In FIGURES 1 and 2 there are shown diagrammatically, the main elements of a loom using the patterning mechanism according to the invention, indicated at F, namely, the main frame 1, the warp beams 2, the sheets of warp thread 3, the heald frame unit 4, the weft selectors 5, the weft nippers 6, the weft drawing devices 7, the cloth beam 8, the rotating equipment 9, and its general driving mechanism 10.

The main frame 1 is arranged according to the number of weaving sections actually forming a complete loom, in the present case three, permitting three fabrics to be woven independently of each other and of a quality and in designs which may be the same or different.

This main frame is arranged so as to be able to carry in a perfectly stable manner, all the fixed and moving elements of the loom as well as the beams and the fabric, with their respective mechanisms and let-off and take-up equipments. In this example, there is also shown, supported upon said main frame 1, an angular platform 11, enabling the loom to be permanently overseen, and permitting easy access to its principal mechanisms.

The warp beams are arranged in the conventional manner and can be readily engaged and disengaged respectively from their support shown schematically at 12; these supports as well as the drawing means for the rolling devices and the beams (not shown) are also known per se.

The sheets 3 of warp threads are, in the present case, conveyed and guided by drums and support elements 13–14–15–16–17 so that said warp threads are always under a practically constant tension; the warp threads then pass into the shed forming means shown schematically at 4, and actuated by a patterning mechanism forming the subject of the invention.

The weft drawing device shown schematically at 7 moves into the shed, after which the fabric is beaten-up and taken up by the take-up roller 8 in the known manner. Such a combination actually forming a loom in itself, is arranged around the longitudinal axis of the loom in a symmetrical manner, and there is maintained between them a gap in which are arranged the mechanisms of the selector, the weft nipper, the selvedge-forming unit, and other auxiliary devices.

In the example shown schematically in FIGURES 1 and 2, the circular loom has thus been divided into six annular zones covering, alternately, a zone of 30° and 90°, indicated at A and B in FIGURE 1. The zones A correspond to the zones for selecting and preparing the weft threads, while zones B correspond to the weaving zones proper.

The subject of the invention concerns more particularly the patterning mechanism shown schematically at F.

Figure 3:
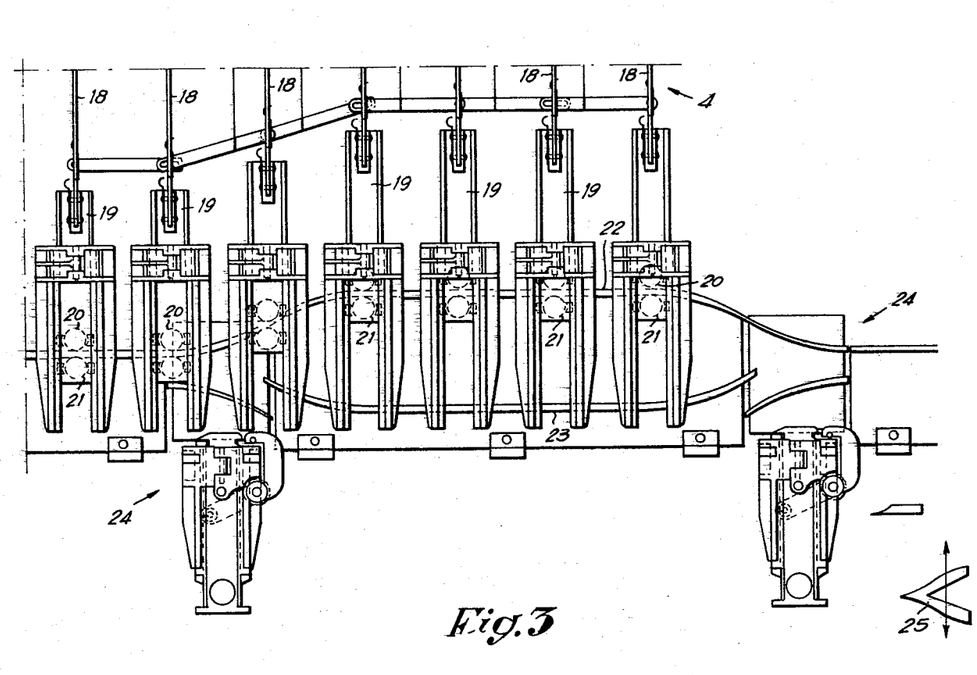
FIGURE 3 shows the essential elements associated, on the one hand, with the shaft frames and, on the other hand, with the patterning mechanism, the subject of the invention.

In the circular loom shown, the heald frames are arranged in such manner that each of the uprights 18 is extended at its lower end by a slide 19 carrying a pair of rollers 20–21 intended to cooperate with the annular roller tracks forming part of the moving equipment of the loom (FIG. 3). These roller tracks consist of pairs of parallel stretches 22–23 associated, at both ends, with a switching unit 24. The switching units cooperate with the non-rotating double cams 25 but can be displaced vertically so as to occupy two typical positions corresponding to the two typical positions of the switching units so as to bring said rollers 20–21 into contact or association either with the upper stretch 22 or the lower stretch 23 of a section to which correspond respectively the upper and lower positions of the corresponding upright of the deformable shaft frame.

The patterning mechanism forming the subject of the invention is intended to control the non-rotating cams 25 and to move them alterately into their two typical positions under the action of a programming device which can be varied according to the fabric to be obtained.

As each heald frame must be controlled individually, a number of such double cams equal to the number of heald frames is provided on the circular loom.

Since, for reasons of construction and compactness, that is, for the purpose of reducing congestion, the slides 19 with their guiding means are grouped in radial rows, which extend circumferentially of the loom. The double cams 25 are preferably likewise grouped in at least one radial row, which reduces to a strict minimum the congestion in the patterning mechanism. If the different weaving sections of a same circular loom are set up so as to produce simultaneously exactly the same fabrics then, for the entire loom it will be possible to use a single radial row of such double cams 25; on the other hand, if it is intended to produce, on the same loom, fabrics of different characteristics then, in the loom, a row of double cams 25 will be provided upstream of each of the weaving sections.

The patterning mechanism according to the invention, namely the mechanism controlling the cams 25 is, in the example shown in FIGS. 4 to 13, composed substantially as follows: each double cam 25 is connected to one of the lateral faces of a slide 26 guided positively in slideways 27 common to all said slides, and attached to a casing 28, itself secured to the main frame 1 of the loom. Articulated to each slide 26 by a pivot 29 is the upper end of a rod 30. Each one of these has towards its lower end a lateral stud 31 and, at an intermediate level two lateral grooves 32–33. This patterning mechanism is controlled by a programming device which, in the present case, consists of a perforated endless strip 34 to which is imparted a stepwise movement and which is coupled to a pair of feelers or needles 35–36 for each shaft frame. Each of these needles is hooked to the end of a lever, 37–38 respectively, mounted on the same shaft 39, supported on the casing 28. On each of said levers 37–38 there rests a peg 40–41 respectively, positively guided in a common support 42, and each supporting the free end of a lever 43–44 respectively. These elements are arranged so that the free ends of the levers 43–44 can be brought into or out of the trajectory of a pusher 45 to which is imparted a constant alternating rectilinear movement. The lever 43, at its other end, is articulated on the pivot 46 connected to an oscillating lever 47, oscillating about an upper shaft 48 and carrying the shaft 49 of a thrust roller 50 in contact with the corresponding part of a rod 30. At its other end, the second lever 44 is articulated via a pivot pin 51, to one of the ends of a cranked lever 52 oscillating about an intermediate shaft 53, this cranked lever also carrying the shaft 54 of a thrust roller 55 thus acting in the opposite direction to the thrust roller 50. The free ends of the two levers 47, 52 are urged towards each other by an interpolated tension spring 56 in such manner that the respective rollers 50–55 are permanently urged in two opposite directions on either side of a rod 30. The shafts 39, 48 and 53 are preferably common to the control means of a radial extension of double cams 25.

Figure 12:
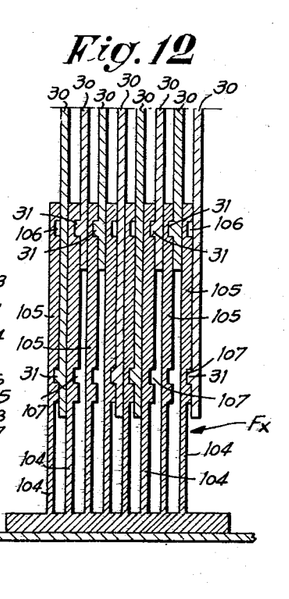
Figure 12A:
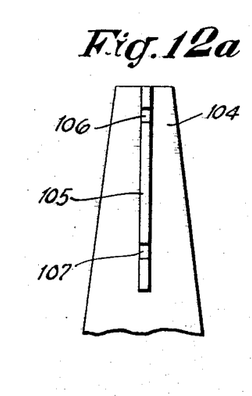
FIGURE 12a is a diagrammatic partial view in the direction of arrow Fx of FIG. 12.
Figure 13:
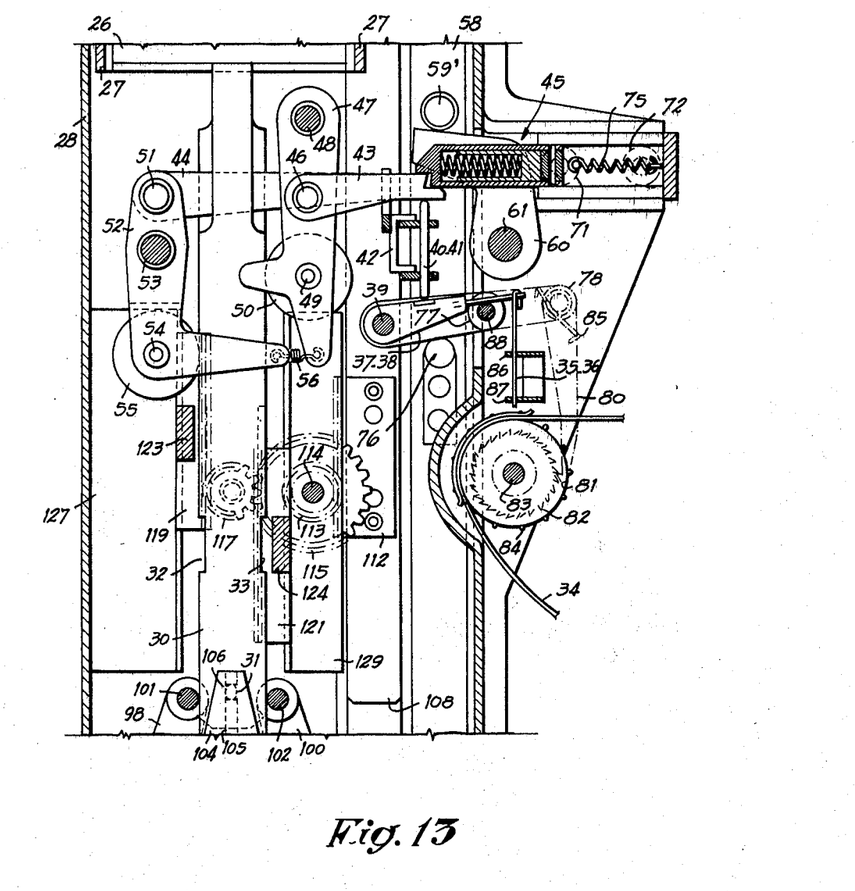
FIGURE 13, is a section on line XIII—XIII of FIGURE 8.

The movements of the programming device using the perforated strip 34 and the alternating rectilinear movements of the pusher device 45, on the other hand, are controlled from the same means. This latter comprises substantially a number of cams 57 equal to the number of weft drawing devices, these being connected to the moving equipment 9 of the loom and being equidistant from and concentric with the main axis of the loom; a vertical rod 58 has at its upper end a roller 59 which can be coupled with the cams 57. This rod 58 is positively guided in the above-mentioned casing 28. At an intermediate point it carries a lateral roller 59' in contact with one of the arms of a cranked lever 60, mounted on a shaft 61, which is in turn mounted on the casing 28. On the shaft 61 there is also fitted a crank 62. The cranked lever 60 and the crank 62 are fitted on either side of the pusher 45 and they have coaxial oblong openings 63–64 in which engage the pegs 65–66 respectively, connected to the side walls of the pusher 45. This latter has the form of a carriage, and for this purpose it is extended at the rear by tail bars 67–68 upon which are mounted the shafts of rollers 69–70–71–72, themselves positively guided in the rails shown at 73–74. The pusher 45 is permanently urged into the retracted position by springs 745. The rod 58 also carries a lateral pin 76, serving as a support for a lever 77 keyed on to the shaft 39. On the shaft 39 there is also keyed a second lever 78, connected by a pivot pin 79 to one of the ends of an arm 80, the other end 81, of which, is in the form of a pawl. The latter cooperates with a ratchet wheel 82, the shaft 83 of which carries two toothed wheels 84 coupled with the holes for driving the perforated strip 34 of the programming device. This mechanism is arranged so that the perforated strip 34 moves along a step, the size of which is equal to the distance between two rows of perforations. It will be seen that in said programming device, being common to all the heald frames, the perforated strip 34 is arranged in such manner that each row will compise as many perforations as there are heald frames, each perforation being divided in two by an emplacement in such manner that, of the needles 35–36 cooperating with said programming device, one half will be engaged in a perforation, and the other half will rest on one of said emplacements. Obviously, in certain cases, this equipment will also enable the preceding selection to be reproduced by the provision of perforations opposite two needles of a pair, and this maintains the position of the corresponding cam 25. The arm 80 is permanently urged towards its engaged position by a spring 85. The needles 35–36 are positively guided in the superposed elements 86–87. Finally, between the levers 77–78, there is fixed a cross-member 88, the object of which is to bring all the needles 35–36 into their upper position or waiting position during the forward movement of strip 34. The same rod 58 carries at its lower end a thrust roller 89 in permanent contact with one of the ends of the ends of an oscillating lever 90, oscillating about the shaft 91. The other end of the lever 90 has a lateral stud 92 preferably in the form of a roller engaging simultaneously in two mutually opposed forks 93–94, each fork being keyed on a shaft 95–96, respectively, upon which is keyed a pair of levers 97–98 and 99–100 respectively. Near their free ends, said levers of each pair are connected by a cross-member 101–102 respectively, which are arranged on either side of the lower end of all the rods 30. Through a single spring 103 interposed between one of the ends of the oscillating lever 90 and the casing 28, it is provided that, simultaneously, the rod 58 is permanently urged upwards while the cross-members 101–102 are permanently urged towards each other and also against the corresponding parts of the rods 30. Co-operating with each of the rods 30 and mounted on the base of the casing 28, there is coupled a fixed side plate 104 having a longitudinal lateral rib 105, having two grooves 106–107 one above the other at positions and distances corresponding to the two typical positions of the rods 30 and therefore of the slide 26 and the double cam 25 (FIGS. 4, 12 and 13).

Figure 7:
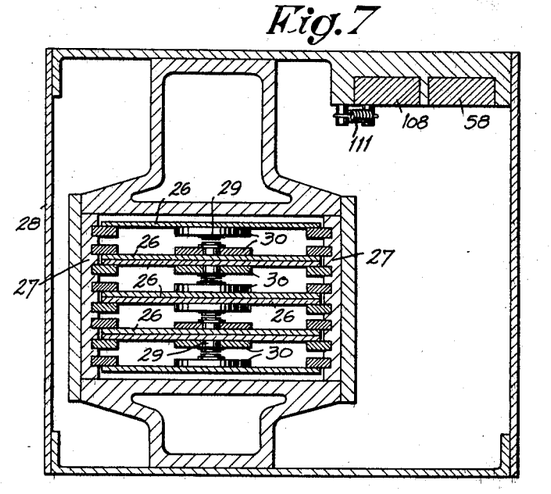
Figure 8:
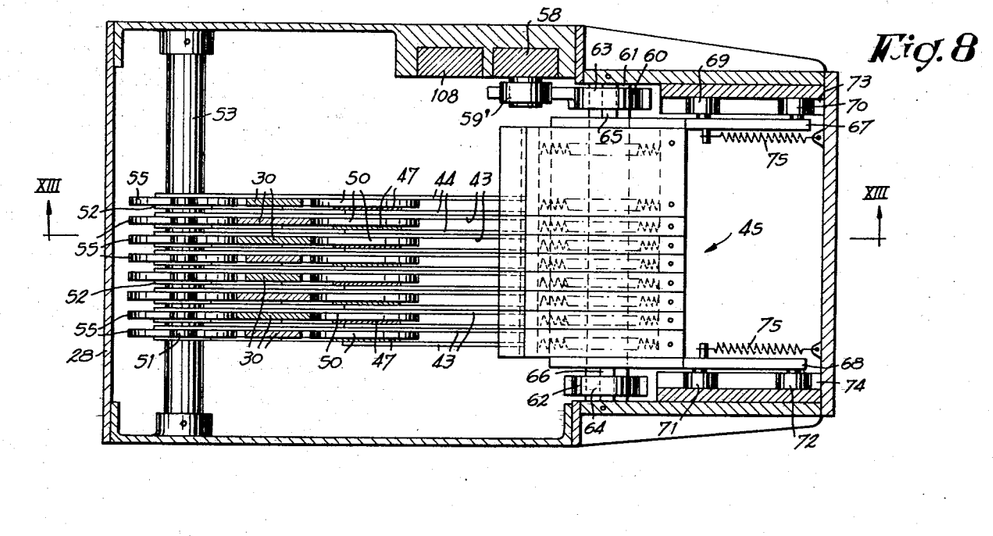
Figure 9:
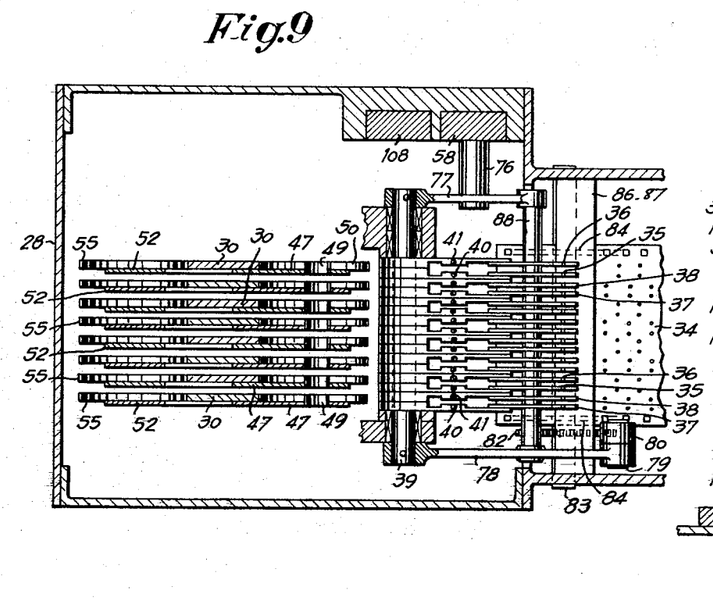
Figure 10:
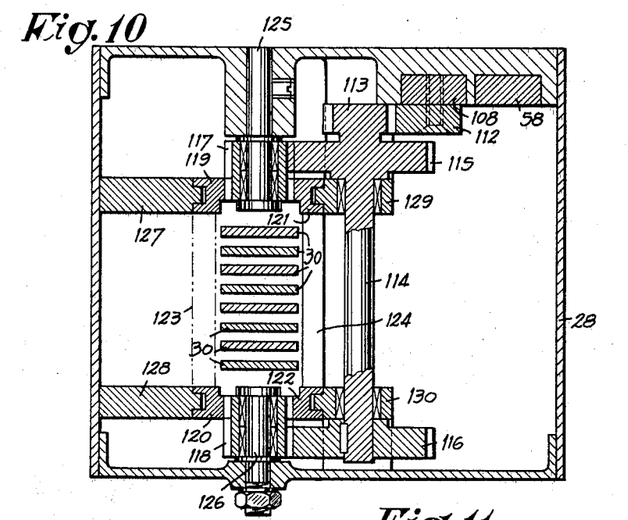
Figure 11:
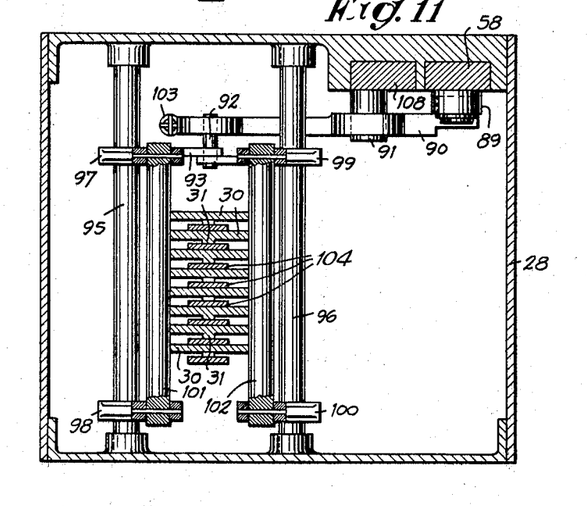

The apparatus also includes a second rod 108 fitted at its upper end with a roller 109 associated with cams 110, also of a number corresponding to the number of weft drawing devices, and carried by the moving equipment, as explained in connection with the cams 57. This rod 108 is permanently urged into its upper position by the spring 111 (FIGS. 4, 5 and 7). On the rod 108 is fixed a rack 112 engaging with a pinion 113, the shaft 114 of which carries, at either end, a toothed wheel 115–116 meshing respectively with pinions 117–118. These in turn simultaneously mesh with two pairs of racks 119–120 and 121–122, which are connected two at a time by a cross-member 123–124 respectively. These cross-members are offset in height at levels corresponding to the two typical position of the cams 25. The shafts 125–126 respectively of the pinions 117–118 are overhung and bear upon the casing 28, while the racks 119–122 are positively guided by slideways 127–130 respectively, mounted on said casing.

The operation of this patterning mechanism is as follows: initially, the perforated support 34, corresponding to the design to be applied, is introduced into the programming device.

Figure 4:
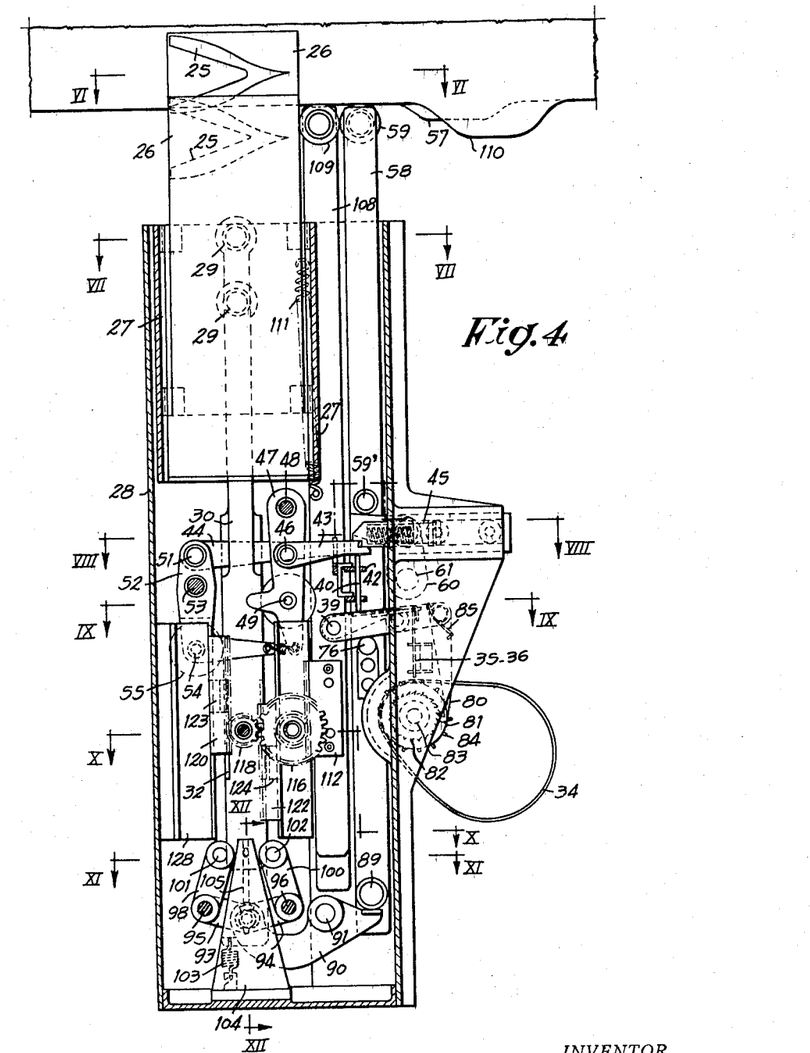
FIGURE 4 represents schematically the essential elements of the section on line IV—IV of FIGURE 2; the patterning mechanism being in the waiting position.
Figure 5:
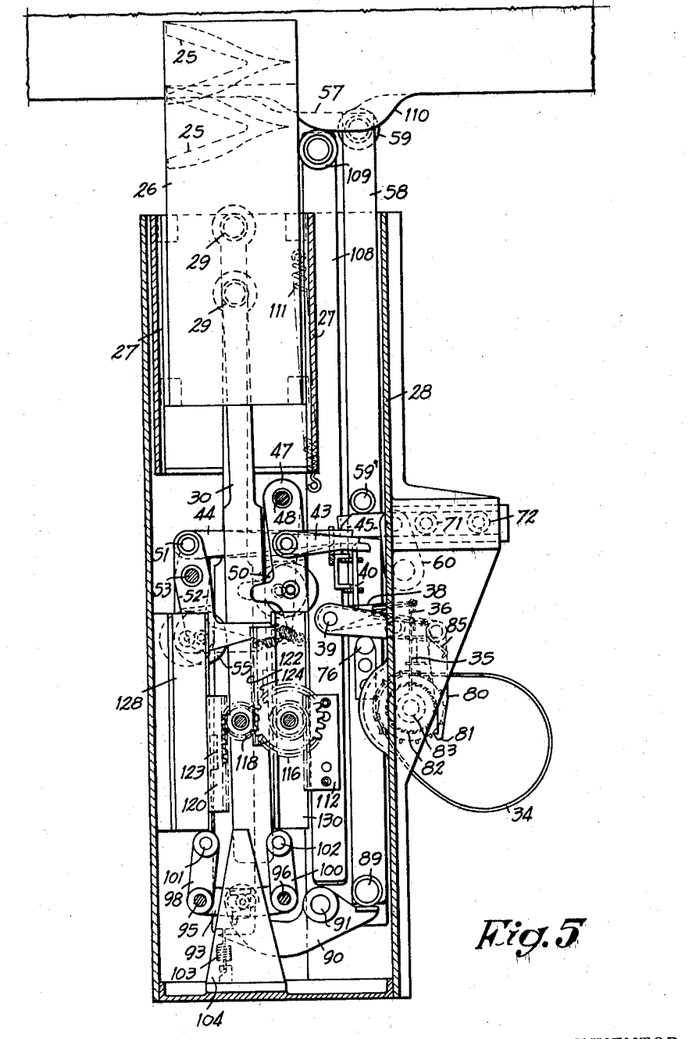
FIGURE 5 is a view similar to that of FIGURE 4, the mechanism being shown in another typical position.
Figure 6:
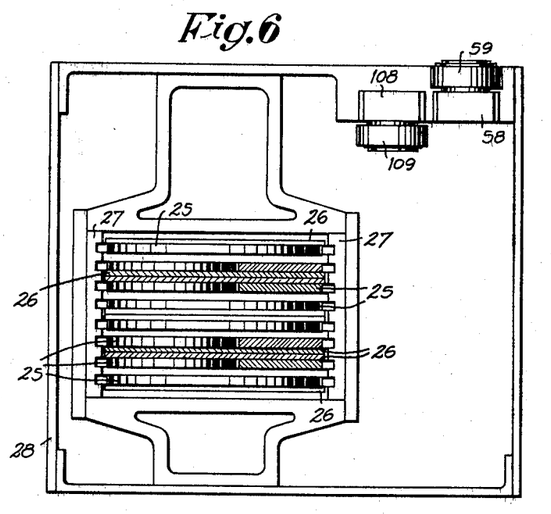
FIGURES 6 to 12 are sections on the lines VI—VI, VII—VII, VIII—VIII, IX—IX, X—X, XI—XI, XII—XII, respectively of FIGURE 4.

The position of the various members as they are shown in the drawing, and more particularly in FIGURE 4, corresponds to the position of the members before a selection, the programming device or the perforated support having moved forward a step. A cam 57 comes into contact with the roller 59 and pushes the rod 58 downwards, stretching the spring 103 via the cranked lever 90. The downward movement of the rod 58 has been precisely followed by the lateral pin 76, causing, ipso facto, the levers 77–78 as well as the cross-member 88 to move downwards in moving about the shaft 39. At the same time the levers 37–38 to which are hooked the needles 35–36 respectively, are released from the support of the cross-member 88. The result is that one of the two needles, namely, the one which is positioning opposite a non-perforated part of the support 34 will remain in the upper position as well as its pin 40 or 41 and its lever stop 43–44 respectively. Conversely, the pin and its corresponding elements opposite a perforation will be brought to the lower position. As shown schematically in FIGURE 5, the needle 36 is held in the upper position and the needle 35 is plunged, and this results in the lever stop 44 being in the trajectory of the pusher 45 while the lever 43 is retracted in relation to this trajectory. By the downward movement of the rod 58, this latter, via the thrust roller 59′ causes the levers 60–62 to oscillate about their shaft 61, which brings about a forward movement of the pushing device 45 via the studs 65–66 engaged in the oblong opening 63–64 in said levers. The pusher 45 will then push back the lever 43. It goes without saying that the pusher 45 which is common to all the levers 43–44 of the mechanism will at the same time push back all the levers positioned in its trajectory, these levers being either levers 43 or 44 depending upon the program generated by the engagement of the perforated support 34 and the pairs of needles 35–36. It is further apparent that, of each pair of needles 35–36, one of them, after each forward step of the perforated support 34 of the programming means, will be held in the upper position, the other being brought into the lower position, being coaxial with one of the perforations, it being understood, as previously stated, that said needles can be brought into the lower position, the perforated support having two adjacent perforations for this purpose. All the levers 43, located in the trajectory of the pusher 45, push their respective rods 30 to the left via their thrust roller 50, while all the levers 44 located in said trajectory push their respective levers to the right via the oscillating lever 52 and the thrust rollers 55. At this moment a certain number of said rods 30 will be slightly displaced towards the right and others displaced towards the left, depending upon the programming system.

At the same time, the cranked lever 90, having oscillated about a shaft 91, through its peg 90, pushes the ends of the forks 93–94 upwards, thus forcing the pairs of levers 97–98 and 99–100 to oscillate about their respective shafts 95–96 moving the cross-members 101–102 away from the rods 30, thus allowing these latter to move angularly about their upper shaft 29 under the action of the thrust rollers 50–55 as has just been described. The studs 31 on the rods 30, ipso facto, are disengaged from the groove 106 or 107 of the blocking devices 104–105 according to whether the corresponding rods are in the upper or the lower position. Through this angular movement, each rod 30 is engaged, via the corresponding groove 32 or 33, by one of the cross-members 123–124, respectively, of the device controlling the upward and downward movements of the rods 30 and therefore of the cams 25. At this moment a cam 110 comes into contact with the roller 109 of the second rod 108 which, in moving downwards, causes the same downward movement of the rack 112 which it carries; this rack imparts a rotary movement to the pinion 113, the shaft 114, and the two toothed wheels 115–116; these latter rotating the two pinions 117–118 respectively which then drive in two mutually opposed directions the pairs of racks 119–120 and 121–122, as well as the cross-members 123–124 respectively connected to them. These cross-members will then carry with them in their upward or downward movement their respective rods 30 and this will place the cams 25 in their position relative to the movement of the heald frames and in dependence upon the programming, namely, upon the design to be provided.

As the moving equipment of the loom continues its rotation and the rods 30 reach their limit positions, the cam 57 releases the roller 59 and also the rod 58 which is brought back into its upper position by the pushing action of the oscillating lever 90, under the action of the spring 103. In its rocking movement, the lever 90 has urged the forks 93–94 downwards through the intermediary of its lateral stud 92, which causes the pairs of levers 97–98 and 99–100 to oscillate, thus causing the approach movement of the cross-members 101–102, which bring into alignment all the rods 30, the lateral studs 31 of which automatically are introduced into the corresponding groove 106–107 of the rib 105 of the blocking device 104–105. By this arrangement, said rods and therefore the slides 26 and the cams 25 are firmly blocked and immobilised, thus imparting to this patterning control mechanism a great bi-directional stability which is necessary in view of the fact that the cams 25 will be very firmly urged alternately downwards and upwards by rollers 20 and 21. In its upward movement, or return movement, the rod 57 through its lug 76, lifts the lever 77 as well as the lever 78 via the shaft 39. Similarly, the cross-member 88 which connects these levers lifts all the needles 35–36 in the lower position, so as thus to bring all the needles into the upper position, namely into the waiting position for a fresh selection. At the same time, the lever 78 lifts the arm 80, the free end of which, forming a pawl, moves the ratchet means 82 one step on as well as the toothed wheels 84 and consequently, the perforated support 34. In the meantime, the roller 59, having released the lever 60, as well as the lever 62 and the studs 65–66, the pusher carriage 45 is brought to the retracted position by its springs 75 and is thus ready for a fresh operation.

When the cam 110 leaves the roller 109 of the second rod 108, the latter is brought to the upper position by its spring 111 and this carries the rack unit into its initial position, by movements the reverse of those which have been described in connection with the downward movement of said rod 108.

It is apparent that the mechanism so provided can take a large number of different forms, it being possible to replace the various members and means described above by other members or means that are equivalent or have an equivalent function. It would also be possible to introduce all kinds of variants into said members and means, and obviously, to complement this mechanism by any accessories thought to be suitable. For example, the pusher carriage 45, which is common to all the pairs of coupled levers, and, to each rod, slide and cam 25, could advantageously be constructed so as to anticipate any failure in one or other of the levers that it has the function of driving. More particularly, it is important to bring in a safety device to deal with the case where the two levers of a pair are simultaneously present in the trajectory of said pusher carriage. For this purpose, it is proposed to provide said pusher carriage in two distinct parts, the one forming an outer envelope comprised of a plurality of individual connected pushers, the other formed by a known means, springs being interposed between each of said individual pushers and the base of said common means, springs also being interposed between said common means and a fixed part of the casing 28.

These individual pushers are slidable and are loaded by individual springs forming a shock absorber. Consequently, if one of these individual pushers encounters a harmful obstacle, it will simply be pushed back, compressing its spring.

It is also obviously possible to conceive other equivalent arrangements.

What I claim is:

1. A patterning mechanism for circular looms having a moving equipment, weft drawing devices and heald frames, said mechanism comprising an annular roller track associated with each heald frame and operable with the moving equipment of the loom, said track consisting of double stretches and switching means between the stretches; at least one radial row of non-rotating cams capable of moving to two different levels, each cam being associated with one of said roller tracks, and a mechanism interposed between said moving equipment of the loom and each of said non-rotating cams and operable to move and block said non-rotating cams at each of said levels, which levels correspond to the heald positions forming weaving sheds.

2. A mechanism according to claim 1, comprising a single control member associated with cams carried by the moving equipment, the number of said cams being equal to that of the weft drawing devices, said control member being operable to effect movements of all the non-rotating cams.

3. A mechanism according to claim 1, comprising a single control member associated with cams carried by the moving equipment, the number of said cams being equal to that of the weft drawing devices, said control member effecting simultaneous blockage of all the non-rotating cams.

4. A mechanism according to claim 2, comprising a programming device controlling the movements of each of said non-rotating cams according to said levels in accordance with a pre-set design, said single member for controlling the movements of all the non-rotating cams being associated with said programming device.

5. A mechanism according to claim 4, wherein the programming device comprises a perforated endless strip and a number of pairs of needles equal in number to that of the heald frames, said needles being controlled by said strip, each needle of a pair being itself associated with a separate oscillating lever, said needles controlling said levers between upper and lower positions, a reciprocating pusher, said positions of said oscillating levers being between in and out of the trajectory of said pusher, and members actuated by said levers for bringing the non-rotating cams into the patterned position.

6. A patterning mechanism according to claim 5, wherein the members bringing the non-rotating cams into the patterned position and set in motion by said levers urged by the pusher comprise oscillating levers, rods and locking elements, said levers being arranged at either side of said rods to oscillate about an upper pivot and are arranged between said locking elements of said rods, one of said elements being moved upwardly while the second element is moved downwardly, each of said oscillating rods being associated with a non-rotating cam so that according to the position of each of the two needles of a pair of needles, the corresponding non-rotating cam will be brought to one of said levels.

7. A patterning mechanism according to claim 6, wherein said single member controlling the movement of the non-rotating cams and of the elements associated therewith comprises a rack connected to said single member and having the form of a vertical rod, toothed wheels meshing with said rack, two diametrically opposed racks, said pinions meshing with the last-mentioned racks which carry the locking members of said oscillating rods, each associated with a non-rotating cam.

8. A patterning mechanism according to claim 7, comprising an oscillating lever coupled with the single member for controlling the blocking of the oscillating rods, each associated with a non-rotating cam, cross-members arranged on either side of the entire row of said oscillating rods, each associated with a non-rotating cam in such manner as to bring them into alignment when they are at the correct level, said oscillating lever controlling the approach and separation movements of said cross-members.

9. A patterning mechanism according to claim 8, comprising hooking means, said oscillating rods being associated with a non-rotating cam and being locked by said hooking means, positively immobilizing said oscillating rods and said non-rotating cams as regards both upward push and downward push.

10. A patterning mechanism according to claim 9, comprising lateral lugs carried by the lower part of each of said oscillating rods and means forming grooves provided at two different levels corresponding to the distance between said levels of said non-rotating cams, fixed supports of a number equal to that of said oscillating rods and adjacent to the lower part of each of said oscillating rods, and a lateral rib on said supports, said lugs, said grooves and said rib constituting the blocking device for the blocking of the non-rotating cams.

References Cited

UNITED STATES PATENTS

| 1,088,666 | 2/1914 | Shayer et al. | 139—72 |
| 1,122,650 | | Shayer | 139—72 |

FOREIGN PATENTS

| 843,659 | 4/1939 | France. |
| 1,027,972 | 2/1953 | France. |
| 1,122,112 | 5/1956 | France. |
| 1,347,072 | 11/1963 | France. |
| 961,699 | 6/1964 | Great Britain. |
| 265,172 | 2/1950 | Switzerland. |

HENRY S. JAUDON, *Primary Examiner.*

U.S. Cl. X.R.

139—66